United States Patent [19]

McWilliams et al.

[11] Patent Number: 4,726,870

[45] Date of Patent: Feb. 23, 1988

[54] METHOD OF MAKING PANELS OF MICROPOROUS THERMAL INSULATION

[75] Inventors: Joseph A. McWilliams, Droitwich; James D. J. Jackson, Kidderminster; Derek E. Morgan, Malvern, all of United Kingdom

[73] Assignee: Micropore International Limited, Droitwich, United Kingdom

[21] Appl. No.: 809,832

[22] Filed: Dec. 9, 1985

[30] Foreign Application Priority Data

Dec. 8, 1984 [GB] United Kingdom ............... 8431076
Mar. 27, 1985 [GB] United Kingdom ............... 8507940

[51] Int. Cl.$^4$ ............................... C09J 5/04
[52] U.S. Cl. ..................... 156/314; 53/436; 53/452; 53/469; 156/87; 156/146; 156/264; 156/276; 156/319; 156/322; 427/293; 427/402
[58] Field of Search ............... 156/87, 314, 146, 319, 156/276, 322, 264; 427/402, 293; 53/456, 452, 469

[56] References Cited

U.S. PATENT DOCUMENTS 2,891,885  6/1959  Brooks ........................ 156/314
3,944,702  3/1976  Clark .......................... 427/402
3,962,014  6/1976  Hughes et al. ................. 156/87

FOREIGN PATENT DOCUMENTS 0096765  6/1982  European Pat. Off. .
82451    6/1971  Fed. Rep. of Germany .

Primary Examiner—John J. Gallagher
Attorney, Agent, or Firm—Browdy and Neimark

[57] ABSTRACT

A panel of microporous thermal insulation which comprises an envelope of glass fibre cloth which surrounds and is bonded to a block of microporous thermal insulation is manufactured by heating the glass fibre cloth so as to drive off organic material, applying a silane in an acidic solution to the cloth, drying the cloth in order to produce cross-linking of the silane so as to cause the cloth to stiffen, and applying to the cloth an aqueous suspension of particulate silica, an aqueous solution of sodium silicate or potassium silicate, or a cellulose solution. Microporous thermal insulation is introduced into a bag mode from the cloth and the bag is then compressed to consolidate the insulating material and to produce a bond between the insulating material and the bag.

16 Claims, 2 Drawing Figures

METHOD OF MAKING PANELS OF MICROPOROUS THERMAL INSULATION

FIELD OF THE INVENTION

The present invention relates to panels of microporous thermal insulation which comprise an envelope of glass fibre cloth which surrounds and is bonded to a block of microporous thermal insulation.

BACKGROUND OF THE INVENTION

Microporous thermal insulation materials are materials which have a lattice structure in which the average interstitial dimension is less than the mean free path of the molecules of air or other gas in which the material is arranged. This results in a heat flow which is less than that attributable to the molecular heat diffusion of air or other gas in which the material is used. The lattice structure is created within a powder material by using a powder with very fine particles which adhere to each other in a chain-like formation. A suitable powder for providing this structure is finely divided silica in the forms normally referred to as silica aerogel or pyrogenic silica, although other materials are also available. The powder may be strengthened by the addition of a reinforcing fibre such as ceramic fibre and an opacifier may be added to provide infra-red opacification.

The microporous thermal insulation material may be formed into a panel by forming an envelope of a porous material, introducing the microporous material into the envelope and compressing the envelope to form a panel in which the compressed microporous material is bonded to the porous material of the envelope.

The porous material used for the envelope is generally a cloth formed of glass fibre. However, we have found that commercially-available glass fibre cloth is not entirely suitable.

DESCRIPTION OF PRIOR ART

During the manufacture of glass fibres a lubricant, predominantly starch, is applied in order to prevent friction damage to the fibres. A further lubricant may be applied to the warp threads prior to weaving the cloth. The resulting glass fibre cloth contains approximately 3 to 5 percent by weight of organic material, but this can be reduced to about 2.0 percent by weight by washing the cloth in boiling water. The washed cloth is dried and then stiffened with an inorganic stiffener. Such a cloth has been used in the manufacture of panels of microporous thermal insulation material for a number of years, but we have found that the organic material in the cloth breaks down when heated and produces smoke and unpleasant odours.

OBJECT OF THE INVENTION

It is therefore an object of the present invention to provide a panel of microporous thermal insulation which, in use, does not produce smoke and unpleasant odours.

SUMMARY OF THE INVENTION

It is known that smoke and smells can be avoided if the glass fibre cloth is heated so as to drive off the organic material prior to the manufacture of the panels of microporous thermal insulation. However, such heat treatment of the cloth leads to a number of other problems:

(a) the glass fibre cloth is no longer sufficiently stiff to be cut easily and accerately, and deforms readily under stress;
(b) the resistance of the cloth to damage is severely impaired; and
(c) the adhesion between the cloth and the microporous material is substantially reduced.

We have found that the stiffness of the heat-treated cloth can be increased by soaking the cloth in colloidal silica, sodium or potassium silicate, or other inorganic glues. However, in all cases where the material is applied in sufficient amounts to be effective, the strength of the cloth is reduced as a result of chemical attack when the cloth is heated, although in some cases the adhesion between the cloth and the microporous material is increased.

We have also found that the resistance to damage of the heat-treated cloth can be improved by reapplying a limited amount of an organic material, but the glass fibre cloth is not stiffened sufficiently and there is very poor adhesion between the cloth and the microporous material. Materials which have been tried include silanes, alcohols, fatty acids and amines.

Surprisingly, we have found that the heat-treated glass cloth can be stiffened sufficiently if a silane is applied to the heat-treated cloth in an acidic solution.

Despite the fact that microporous material containing pyrogenic silica or silica aerogel will not adhere to the silane-treated cloth, we have found that solutions of celluloses and suspensions of silica will form a coating on the silane-treated cloth as will aqueous solutions of sodium silicate and potassium silicate. Further, these coatings enable the microporous material to adhere adequately to the glass cloth.

According to the present invention there is provided a method of manufacturing a panel of microporous thermal insulation, which method comprises the steps of:

heating a glass fibre cloth so as to drive off organic material associated with the cloth;

applying to the heat-treated cloth a silane in an acidic solution;

drying the silane-treated cloth at a temperature which produces cross-linking of the silane so as to cause the cloth to stiffen;

applying to the dried silane-treated cloth an aqueous suspension of particulate silica, the silica having a particle size less than 1 $\mu$m and a surface area of at least about 50 m$^2$/g, an aqueous solution of sodium silicate or potassium silicate, or a cellulose solution;

drying the cloth;

forming the cloth into a bag;

introducing a microporous thermal insulation material into the bag;

sealing the bag; and applying pressure to the exterior of the bag to consolidate the insulating material in block form and to create a tension strain in the glass fibre cloth, the glass fibre cloth being bonded to the block of microporous thermal insulation material.

Preferably the silane does not contain nitrogen or halogen atoms. The silane may be, for example, $\gamma$-glycidoxypropyltrimethoxysilane. The pH of the acidic solution may be in the range from 3 to 4.5. The acidification of the solution may be achieved by means of citric acid, acetic acid or tartaric acid. The concentration of the silane in the acidic solution may be at least 0.1 percent by weight and is preferably substantially 0.5 percent by weight.

Where the cloth is treated with γ-glycidoxypropyltrimethoxysilane, the cloth may be dried at a temperature in the range from 150° C. to 200° C. in order to produce cross-linking of the silane.

The particulate silica may comprise colloidal silica, precipitated silica, pyrogenic silica or silica aerogel. The aqueous suspension of silica preferably contains less than approximately 10 percent by weight of silica.

Alternatively, the aqueous solution may comprise a solution of sodium or potassium silicate containing less than 0.3 percent by weight of alkali. Preferably, the aqueous solution contains approximately 1 percent by weight of sodium or potassium silicate.

Alternatively, the cellulose solution may comprise a solution of methyl cellulose, ethyl cellulose, hydroxypropylmethyl cellulose or hydroxymethyl cellulose. Preferably, the solution contains less than approximately 1 percent by weight of cellulose.

The suspension or solution may be applied by passing the cloth through a bath or by spraying or rolling onto the surface of the cloth.

The cloth which has been treated with the suspension or solution may be dried at a temperature up to 200° C. Preferably the cloth is dried at a temperature above 100° C.

The bag may be compressed at a pressure in the range from 50 to 300 psi.

For a better understanding of the present invention and to show more clearly how it may be carried into effect reference will now be made, by way of example, to the accompanying drawings in which:

DESCRIPTION OF PREFERRED EMBODIMENT

Figure 1:
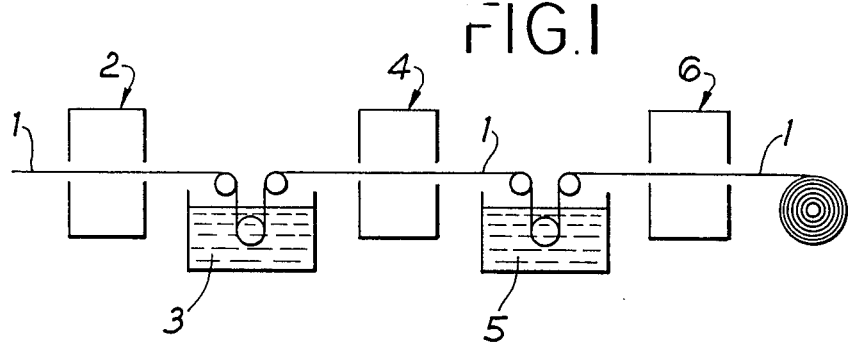
FIG. 1 shows diagrammatically the steps involved in producing a glass fibre cloth for use in the method according to the present invention.

FIG. 1 shows a length of glass fibre cloth 1 which passes through an oven 2 in order to drive off organic material from the cloth. The temperature of the oven is in the range from 400° C. to 600° C.

The heat-treated cloth is passed through a bath 3 which contains a silane, for example, a γ-glycidoxypropyltrimethoxysilane, in an acidic solution having a pH in the range of 3 to 4.5. The solution may be acidified by means of citric acid, acetic acid or tartaric acid. The concentration of the silane in the solution is in the range of from 0.1 to 10 percent by weight and is preferably about 0.5 percent by weight. The silane should not contain nitrogen or halogen atoms because these could lead to the formation of corrosive or noxious products.

The silane-treated cloth is then passed through an oven 4 at a temperature in the range of 150° C. to 200° C. in order to dry the cloth and to cause it to stiffen. However, if another silane is used the cloth may be dried at any suitable temperature range which produces cross-linking of the silane.

A heat-treated glass fibre cloth which has a silane applied to it as described above is not only strong and sufficiently stiff, but is also resistant to deformation under shearing forces. The resistance to damage is significantly improved, but there is still very poor adhesion between the cloth and the microporous material. However, the cloth is passed through a further bath 5 which contains a solution of cellulose, an aqueous solution of sodium silicate or potassium silicate, or a suspension of silica such as colloidal silica, precipitated silica, pyrogenic silica or silica aerogel in water.

Where particulate forms of silica are used, the particle size should be less than 1 μm and the surface area of the particles should be at least about 50 m²/g. The amount of silica in the suspension is preferably less than about 10 percent by weight.

Where sodium or potassium silicate is used, we have found that adhesion between the cloth and the microporous material increases as concentration increases. However, these silicates to cause the glass fibres to devitrify and weaken when heated, but if the concentration of alkali material is kept sufficiently low the effect on the cloth is negligible.

In order to keep the alkali attack at a low level it is best to use the silicate at a concentration at which the alkali content is below 0.3 percent by weight. Preferably an aqueous solution containing about 1 percent by weight sodium or potassium silicate is used for a silicate solution having an alkali oxide content of about 9 percent by weight. However, for solutions having different proportions of alkali oxide it may be desirable to vary the concentration of the silicate in the solution.

A number of cellulose solutions have been used successfully, including solutions of methyl cellulose, ethyl cellulose, hydroxypropylmethyl cellulose and hydroxymethyl cellulose.

The amount of cellulose in solution is preferably less than about 1 percent by weight and the silane-treated cloth is immersed in the cellulose solution for only a short time. Using low concentrations of cellulose and short immersion times we have found that the carbon content of the treated cloth remains low. This is illustrated in the following Table where the cellulose used is hydroxypropylmethyl cellulose:

TABLE

| Concentration % by weight | Immersion time Seconds | Carbon content of cloth % by weight |
|---|---|---|
| 0.25 | 1 | 0.13 |
| 0.25 | 5 | 0.19 |
| 0.25 | 10 | 0.19 |
| 0.50 | 1 | 0.20 |
| 0.50 | 5 | 0.21 |
| 0.50 | 10 | 0.25 |
| 0.75 | 1 | 0.28 |
| 0.75 | 5 | 0.30 |
| 0.75 | 10 | 0.32 |

Although it is not shown in the drawings, as an alternative to passing the cloth through a bath the solution may be applied by spraying or rolling onto the surface of the cloth.

The cloth is then dried in a further oven 6 at a temperature up to 200° C., and preferably at a temperature above 100° C.

Certain organo-functional silanes known as coupling agents have the ability to produce sound bonds between an inorganic substrate such as glass and an organic material such as a resin because their silane groups react with the glass and their organic groups react with the resin. In the present situation it is surprising to find that, after treating the glass cloth with the silane, the remaining organic groups will bond with particulate silica, a silicate or a cellulose thus coupling the microporous material with the silane-treated glass fibre cloth.

Although the cellulose solution provides an adequate stiffness in the resulting cloth it has proved possible further to stiffen the cloth by adding to the cellulose solution an inorganic filler such as a clay or an inorganic fibrous material. Suitable clays include bentonite and china clay and suitable inorganic fibrous materials include wollastonite and manufactured fibres.

The microporous thermal insulation material may be made by mixing together microporous silica, for example silica aerogel or pyrogenic silica, and an infra-red opacifier such as rutile. The amount of opacifier is preferably in the range of from one tenth to twice the weight of the silica. A reinforcing fibrous material such as aluminosilicate fibre can also be added to the mixture.

Figure 2:
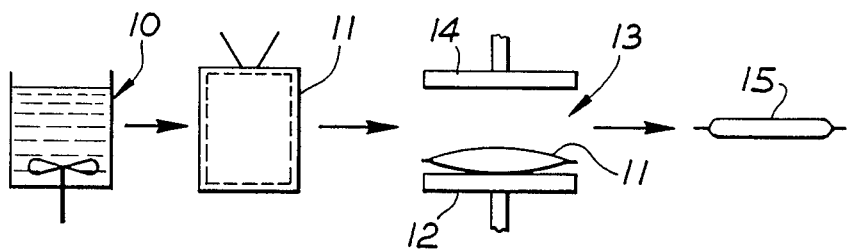
FIG. 2 is a diagrammatic representation of the steps involved according to the present invention in producing a panel from the glass fibre cloth.

As shown diagrammatically in FIG. 2, the components are intimately mixed together in a mixer 10 and are then placed in a bag 11 made from glass fibre cloth as described above. Although it is not illustrated, the bag may be filled with the insulating material by attaching the bag to a discharge nozzle at the end of a feed pipe for the insulating material, arranging the bag within a chamber connected to a suction device and reducing the pressure within the chamber so as to induce the flow of insulating material into the bag. When sufficient insulating material has entered the bag, the application of suction is discontinued, the bag is removed from the chamber and disconnected from the discharge nozzle. The open mouth of the bag 11 is then closed, for example by sewing.

The closed bag 11 containing the insulating material is placed on the bottom die 12 of a press 13 and the upper die 14 of the press is lowered so as to compress the bag 11 and the insulating material into a semi-rigid panel 15. The two dies 12,14 of the press are formed so as to permit the escape of air through the pores of the bag, but there is a build-up of pressure within the bag 11 which gives rise to a tensile strain in the glass fibre cloth. The pressure of the dies 12,14 of the press upon the bag of insulating material causes air to escape from the bag through the pores of the glass fibre cloth and the particles of microporous silica become bonded to each other and to the glass fibre cloth. The pressures used in compressing the bag are generally in the range of from 50 to 300 psi.

The panel 15 of microporous thermal insulation material is then removed from the press 13.

We claim:

1. A method for manufacturing a panel of microporous thermal insulation material, which method comprises the steps of:
    heating a glass fibre cloth so as to drive off organic material associated with the cloth;
    applying to the heat-treated cloth a silane in an acidic solution;
    drying the silane treated cloth at a temperature which produces crosslinking of the silane so as to cause the cloth to stiffen;
    applying to the dried silane-treated cloth a substance selected from the group consisting of an aqueous solution of sodium silicate, an aqueous solution of potassium silicate, and a cellulose solution;
    drying the cloth;
    forming the cloth into a bag;
    introducing a microporous thermal insulation material into the bag;
    sealing the bag and
    applying pressure to the exterior of the bag to consolidate the insulating material in block form and to create a tension strain in the glass fiber cloth, the glass fiber cloth being bonded to the block of microporous thermal insulation material.

2. A method according to claim 1, wherein the silane does not contain nitrogen or halogen atoms.

3. A method according to claim 2, wherein the silane comprises γ-glycidoxypropyltrimethoxysilane.

4. A method according to claim 3, wherein the silane-treated cloth is dried at a temperature in the range from 150° C. to 200° C.

5. A method according to claim 1, wherein the pH of the acidic solution is in the range from 3 to 4.5.

6. A method according to claim 1, wherein the acidification of the solution is achieved by means of an acid selected from the group consisting of citric acid, acetic acid and tartaric acid.

7. A method according to claim 1, wherein the concentration of the silane in the acidic solution is at least 0.1 percent by weight.

8. A method according to claim 7, wherein the concentration of the silane in the acidic solution is substantially 0.5 percent by weight.

9. A method according to claim 1, wherein the substance applied to the dried silane-treated cloth is an aqueous solution of sodium silicate or potassium silicate, and wherein said aqueous solution of sodium or potassium silicate contains less than 0.3 percent by weight of alkali.

10. A method according to claim 9, wherein the aqueous solution contains approximately 1 percent by weight of silicate material.

11. A method according to claim 1, in which a cellulose solution is applied to the dried silane-treated cloth, wherein the cellulose is selected from the group consisting of methyl cellulose, ethyl cellulose, hydroxypropylmethyl cellulose and hydroxymethyl cellulose.

12. A method according to claim 11, wherein the solution contains less than approximately 1 percent by weight of cellulose.

13. A method according to claim 1, wherein the suspension or solution is applied by passing the cloth through a bath or by spraying or rolling onto the surface of the cloth.

14. A method according to claim 1, wherein the cloth which has been treated with the suspension or solution is dried at a temperature up to 200° C.

15. A method according to claim 14, wherein the cloth is dried at a temperature above 100° C.

16. A method according to claim 1, wherein the bag is compressed at a pressure in the range from 50 to 300 psi.

* * * * *